(12) United States Patent
Han et al.

(10) Patent No.: US 9,417,502 B2
(45) Date of Patent: *Aug. 16, 2016

(54) ACOUSTO-OPTIC DEVICE HAVING WIDE DIFFRACTION ANGLE, OPTICAL SCANNER, LIGHT MODULATOR, AND DISPLAY APPARATUS USING THE ACOUSTO-OPTIC DEVICE

(71) Applicant: SAMSUNG ELECTRONICS CO., LTD., Suwon-si (KR)

(72) Inventors: Seung-hoon Han, Seoul (KR); Wan-joo Maeng, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,055

(22) Filed: May 27, 2015

(65) Prior Publication Data

US 2015/0253644 A1 Sep. 10, 2015

Related U.S. Application Data

(63) Continuation of application No. 13/585,293, filed on Aug. 14, 2012, now Pat. No. 9,069,228.

(30) Foreign Application Priority Data

Aug. 25, 2011 (KR) .......................... 10-2011-0085149

(51) Int. Cl.
*G03H 1/02* (2006.01)
*G02F 1/335* (2006.01)
(Continued)

(52) U.S. Cl.
CPC .............. *G02F 1/335* (2013.01); *G02B 27/225* (2013.01); *G03H 1/02* (2013.01); *G03H 1/2294* (2013.01); *G02F 2202/32* (2013.01); *G03H 2001/2292* (2013.01); *G03H 2225/21* (2013.01)

(58) Field of Classification Search
None
See application file for complete search history.

(56) References Cited

U.S. PATENT DOCUMENTS 7,181,120 B2  2/2007  Sugitatsu et al.
7,836,566 B1  11/2010  Olsson et al.
(Continued)

FOREIGN PATENT DOCUMENTS

EP           1336892 A1       8/2003
KR   10-2002-0075273         10/2002
(Continued)

OTHER PUBLICATIONS

European Extended Search Report issued Nov. 2, 2012 in counterpart European Patent Application No. 12181226.7 (12 pages, in English).

(Continued)

*Primary Examiner* — Jennifer L. Doak
(74) *Attorney, Agent, or Firm* — NSIP Law

(57) ABSTRACT

An acousto-optic device having a wide range of diffraction angle and an optical scanner, a light modulator, and a display apparatus using the acousto-optic device are provided. The acousto-optic device includes a core layer having a periodic photonic crystal structure in which unit cells of predetermined patterns are repeated, a first clad layer on a first surface of the core layer, the first clad layer having a refractive index that is different from a refractive index of the core layer, a second clad layer on a second surface of the core layer, the second surface being opposite the first surface, the second clad layer having a refractive index that is different from the refractive index of the core layer, and a sound wave generator configured to apply surface acoustic waves (SAW) to the core layer, the first clad layer, the second clad layer, or any combination thereof.

21 Claims, 5 Drawing Sheets

(51) Int. Cl.
*G03H 1/22* (2006.01)
*G02B 27/22* (2006.01)

(56) References Cited

U.S. PATENT DOCUMENTS

| | | | |
|---|---|---|---|
| 9,069,228 B2* | 6/2015 | Han et al. | 359/1 |
| 2001/0026659 A1 | 10/2001 | Sekine et al. | |
| 2004/0062505 A1* | 4/2004 | Sugitatsu | G02B 6/1225 385/131 |
| 2005/0052724 A1* | 3/2005 | Suzuki et al. | 359/305 |
| 2009/0040294 A1 | 2/2009 | Smalley et al. | |
| 2010/0134867 A1* | 6/2010 | Gugel et al. | 359/287 |

FOREIGN PATENT DOCUMENTS

| | | |
|---|---|---|
| KR | 10-2011-0008956 A | 8/2012 |
| KR | 10-2011-0063045 A | 1/2013 |

OTHER PUBLICATIONS

Krishnamurthy, Srinivasan et al., Optical Modulation in Photonic Band Gap Structures by Surface Acoustic Waves, Journal of Applied Physics, vol. 96, No. 4, Aug. 15, 2004 (8 pages, in English).

Santos, Paulo V., "Collinear Light Modulation by Surface Acoustic Waves in Laterally Structured Semiconductors," Journal of Applied Physics, vol. 89, No. 9, May 1, 2001 (7 pages, in English).

\* cited by examiner

ACOUSTO-OPTIC DEVICE HAVING WIDE DIFFRACTION ANGLE, OPTICAL SCANNER, LIGHT MODULATOR, AND DISPLAY APPARATUS USING THE ACOUSTO-OPTIC DEVICE

CROSS-REFERENCE TO RELATED APPLICATIONS

This application is a Continuation application of U.S. application Ser. No. 13/585,293, filed Aug. 14, 2012, which claims the benefit under 35 U.S.C. §119(a) of Korean Patent Application No. 10-2011-0085149, filed on Aug. 25, 2011, in the Korean Intellectual Property Office, the entire disclosure of which is incorporated herein by reference for all purposes.

BACKGROUND

1. Field

The following description relates to acousto-optic devices having a wide range of diffraction angle, optical scanners, light modulators, and display apparatuses using the acousto-optic devices, and, for example, to acousto-optic devices capable of increasing a diffraction angle range or adjusting diffraction angle characteristics of an output light by using a strong anisotropic refractive index that generates around a photonic band gap of a photonic crystal, optical scanners, light modulators, and display apparatuses using the acousto-optic devices.

2. Description of Related Art

The acousto-optic effect serves to regularly change a refractive index of light in a medium by changing degrees of compression and rarefaction of the medium using sonic waves or ultrasonic waves. The acousto-optic effect may enable the medium to function as a phase grating. Thus, light that is incident to the medium may be diffracted according to the acousto-optic effect.

In addition, the medium that diffracts the incident light according to the acousto-optic effect is generally referred to as an acousto-optic medium. An intensity of light diffracted by the acousto-optic medium and angle at which the light is diffracted by the acousto-optic medium may vary respectively depending on intensity and frequency of sound waves. Therefore, an acousto-optic device, in which a sound wave generator (e.g., an ultrasonic wave generator) is mounted on a surface of the acousto-optic medium, may be applied in a light modulator to modulate an amplitude of the light, or an optical scanner to deviate the light.

However, a natural acousto-optic medium may be limited with respect to optical anisotropy and acousto-optic transformation rates. Therefore, acousto-optic devices using the natural acousto-optic medium may be limited with respect to the diffraction angle of the output light. That is, in related acousto-optic devices using the natural acousto-optic medium, a width of a range of the diffraction angle is insufficient to provide adequate modulation or deviation of the output light.

Therefore, when related acousto-optic devices are used in optical scanners, light modulators, displays, and other similar systems, an additional optical system is necessary in order to compensate for the limited diffraction angle range. The inclusion of the additional optical system may increase the size of the above-referenced systems or serve to degrade resolution in the above-referenced systems. Accordingly, there is a need for developing acousto-optic devices having increased diffraction angle ranges. Research is actively being conducted involving the structuring of the acousto-optic medium in various shapes within acousto-optic devices.

SUMMARY

In one general aspect, there is provided an acousto-optic device, including a core layer having a periodic photonic crystal structure in which unit cells of predetermined patterns are repeated, a first clad layer on a first surface of the core layer, the first clad layer having a refractive index that is different from a refractive index of the core layer, a second clad layer on a second surface of the core layer, the second surface being opposite the first surface, the second clad layer having a refractive index that is different from the refractive index of the core layer, and a sound wave generator configured to apply surface acoustic waves (SAW) to the core layer, the first clad layer, the second clad layer, or any combination thereof. The core layer, the first clad layer, the second clad layer, or any combination thereof to which the SAW are applied includes an acousto-optic material.

The general aspect of the acousto-optic device may further provide that the acousto-optic material includes ZnO, ZnS, AlN, $Al_2O_3$, $LiNbO_3$, $TiO_2$, Si, $SrTiO_3$, or any combination thereof.

The general aspect of the acousto-optic device may further provide that the first clad layer, the second clad layer, or a combination thereof is air.

The general aspect of the acousto-optic device may further provide that the sound wave generator is disposed on a surface of the core layer, the first clad layer, the second clad layer, or any combination thereof.

The general aspect of the acousto-optic device may further provide that the core layer, the first clad layer, the second clad layer, or any combination thereof to which the SAW are applied includes a piezoelectric material as the sound wave generator.

The general aspect of the acousto-optic device may further provide that the sound wave generator is on a side surface of the acousto-optic device.

The general aspect of the acousto-optic device may further provide that the periodic photonic crystal structure includes a periodic structure in which two or more materials having different dielectric constants are regularly arranged in a two-dimensional (2D) or a three-dimensional (3D) structure.

The general aspect of the acousto-optic device may further provide that the first and second clad layers have periodic photonic crystal structures with equal periodicity to the photonic crystal structure of the core layer.

The general aspect of the acousto-optic device may further provide that the core layer includes dielectric particles arranged in a regular period structure, and air is filled between the dielectric particles.

The general aspect of the acousto-optic device may further provide that the core layer includes a dielectric substrate with dielectric particles arranged in the periodic photonic crystal structure.

The general aspect of the acousto-optic device may further provide that the dielectric particles are formed of air or a dielectric material, the dielectric material having a refractive index that is different from a refractive index of the dielectric substrate.

The general aspect of the acousto-optic device may further provide that a region of the core layer in which an angular distribution of the refractive index becomes flat is at certain frequencies and wave vectors of lights around a photonic bandgap.

The general aspect of the acousto-optic device may further provide that the core layer has an anisotropic refractive index distribution of a polygonal shape, in which refractive indices toward its vertexes are different from refractive indices toward an intermediate portion of sides of the refractive index distribution.

The general aspect of the acousto-optic device may further provide that incident light proceeds to a vertex of the refractive index distribution of the core layer, and the SAW proceeds along a region where the refractive index distribution of the core layer is flat.

In another general aspect, there is provided an optical scanner, including a first acousto-optic device configured to diffract and/or deflect light in a first direction, a second acousto-optic device configured to diffract and/or deflect light in a second direction that is perpendicular to the first direction, and light-coupling device that makes light incident to the first acousto-optic device. Each of the first and second acousto-optic devices includes a core layer having a periodic photonic crystal structure in which unit cells of predetermined patterns are repeated, a first clad layer on a first surface of the core layer, the first clad layer having a refractive index that is different from a refractive index of the core layer, a second clad layer on a second surface of the core layer, the second surface being opposite the first surface, the second clad layer having a refractive index that is different from the refractive index of the core layer, and a sound wave generator configured to apply surface acoustic waves (SAW) to the core layer, the first clad layer, the second clad layer, or any combination thereof. The core layer, the first clad layer, the second clad layer, or any combination thereof to which the SAW are applied includes an acousto-optic material.

The general aspect of the optical scanner may further provide a substrate including the first and second acousto-optic devices, the first and second acousto-optic devices being adjacent to each other.

The general aspect of the optical scanner may further provide that the sound wave generator of the first acousto-optic device is on the substrate, and the sound wave generator of the second acousto-optic device is on an upper surface of the second acousto-optic device.

In yet another general aspect, there is provided a two-dimensional (2D)/three-dimensional (3D) switchable image display apparatus, including a display panel, and an acousto-optic device array on a front surface of the display panel, the acousto-optic device array being configured to diffract and/or deflect images displayed on the display panel, the acousto-optic device array including acousto-optic devices, each of the acousto-optic devices including a core layer having a periodic photonic crystal structure in which unit cells of predetermined patterns are repeated, a first clad layer on a first surface of the core layer, the first clad layer having a refractive index that is different from a refractive index of the core layer, a second clad layer on a second surface of the core layer, the second surface being opposite the first surface, the second clad layer having a refractive index that is different from the refractive index of the core layer, and a sound wave generator configured to apply surface acoustic waves (SAW) to the core layer, the first clad layer, the second clad layer, or any combination thereof. The core layer, the first clad layer, the second clad layer, or any combination thereof to which the SAW are applied includes an acousto-optic material.

The general aspect of the 2D/3D switchable image display apparatus may further provide that a height of each of the acousto-optic devices is equal to a height of one or more pixel rows of the display panel.

The general aspect of the 2D/3D switchable image display apparatus may further provide that each of the acousto-optic devices extends in a transverse direction, and is arranged along a longitudinal direction.

The general aspect of the 2D/3D switchable image display apparatus may further provide that each of the acousto-optic devices corresponds to one or more pixel rows of the display panel.

In still another general aspect, there is provided a holographic display apparatus, including a light source configured to provide light, an acousto-optic device array including a plurality of acousto-optic devices, each of the acousto-optic devices being configured to diffract and/or deflect the light provided from the light source, each of the acousto-optic devices including a core layer having a periodic photonic crystal structure in which unit cells of predetermined patterns are repeated, a first clad layer on a first surface of the core layer, the first clad layer having a refractive index that is different from a refractive index of the core layer, a second clad layer on a second surface of the core layer, the second surface being opposite the first surface, the second clad layer having a refractive index that is different from the refractive index of the core layer, and a sound wave generator configured to apply surface acoustic waves (SAW) to the core layer, the first clad layer, the second clad layer, or any combination thereof, and a projection optical system configured to project the light diffracted by the acousto-optic device array. The core layer, the first clad layer, the second clad layer, or any combination thereof to which the SAW are applied includes an acousto-optic material.

The general aspect of the holographic display apparatus may further provide that each of the acousto-optic devices extends in a transverse direction, and is arranged along a longitudinal direction.

The general aspect of the holographic display apparatus may further provide that the acousto-optic devices generate hologram rows in a horizontal direction of a hologram image, and each of the acousto-optic devices corresponds respectively to one or more of the horizontal hologram rows.

In an additional general aspect, there is provided an acousto-optic device, including a core layer including an acousto-optic material, the core layer having a periodic photonic crystal structure in which unit cells of predetermined patterns are repeated, the core layer being configured to generate a region at certain frequencies and wave vectors of lights around a photonic bandgap in which an angular distribution of a refractive index becomes flat, and a sound wave generator configured to provide surface acoustic waves (SAW) along the flat region of the angular distribution of the refractive index in the core layer. Incident light proceeding toward a vertex of the angular distribution of the refractive index is diffracted along the flat region of refractive index distribution toward an adjacent vertex.

The additional general aspect of the acousto-optic device may further provide a first clad layer on a first surface of the core layer, the first clad layer having a refractive index that is different from the refractive index of the core layer, and a second clad layer on a second surface of the core layer, the second surface being opposite the first surface, the second clad layer having a refractive index that is different from the refractive index of the core layer. The sound wave generator is further configured to apply the SAW to the core layer, the first clad layer, the second clad layer, or any combination thereof. The core layer, the first clad layer, the second clad layer, or any combination thereof to which the SAW are applied includes the acousto-optic material.

Other features and aspects may be apparent from the following detailed description, the drawings, and the claims.

Figure 1:
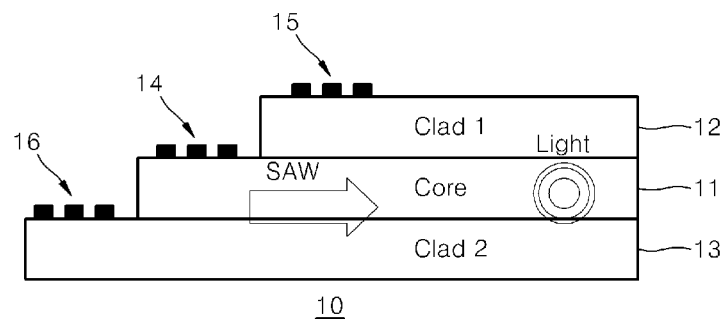
FIG. 1 is a schematic cross-sectional view illustrating an acousto-optic device according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a schematic cross-sectional view illustrating an acousto-optic device 10 according to an example embodiment. Referring to FIG. 1, the acousto-optic device 10 includes a core layer 11, a first clad layer 12, and a second clad layer 13. The first clad layer 12 and the second clad layer 13 are disposed respectively on an upper surface and a lower surface of the core layer 11. A refractive index of the core layer 11 is different from refractive indices of the first and second clad layers 12, 13. For example, the refractive index of the core layer 11 may be greater or less than the refractive indices of the first and second clad layers 12, 13. In this structure, light incident to the acousto-optic device 10 is captured between the first and second clad layers 12, 13, and proceeds along the core layer 11. Therefore, the acousto-optic device 10 may function as a waveguide of the incident light.

As noted above, the refractive index of the core layer 11 is to be different from the refractive indices of the first and second clad layers 12, 13. While there is no limitation in selecting materials forming the core layer 11 and the first and second clad layers 12, 13, the core layer 11, the first clad layer 12, the second clad layer 13, or any combination thereof may be formed of an acousto-optic material having an acousto-optic effect. When the core layer 11, the first clad layer 12, the second clad layer 13, or any combination thereof is formed of acousto-optic material, a local density of the acousto-optic device 10 may be changed in various forms, for example, repeatedly changed corresponding to compression and rarefaction of sound waves applied to the acousto-optic device 10. The acousto-optic material may be, for example, ZnO, ZnS, AlN, $Al_2O_3$, $LiNbO_3$, $TiO_2$, Si, or $SrTiO_3$. In addition, the first clad layer 12, the second clad layer 13, or a combination thereof may be formed of air.

In addition, the acousto-optic device 10 includes one or more sound wave generators 14, 15, 16, which may apply source waves to the core layer 11, the first clad layer 12, the second clad layer 13, or any combination thereof. For example, the sound wave generators 14, 15, 16 may be electroacoustic modulators that generate surface acoustic waves (SAW) such as ultrasonic waves according to applied electric signals. Although the sound wave generators 14, 15, 16 are disposed on surfaces of the core layer 11, the first clad layer 12, and the second clad layer 13 in FIG. 1, respectively, the sound wave generators may be disposed on the core layer 11, the first clad layer 12, the second clad layer 13, or any combination thereof.

The core layer 11, the first clad layer 12, the second clad layer 13, or any combination thereof may function as a sound wave generator if formed of a piezoelectric material. For example, if the first clad layer 12 is formed of the piezoelectric material, when a voltage is applied to the first clad layer 12, the first clad layer 12 may vibrate and generate SAW. Otherwise, only one sound wave generator may be disposed adjacent to a side surface of the acousto-optic device 10.

According to the acousto-optic device 10, the core layer 11 may have a two-dimensional (2D) or a three-dimensional (3D) regular photonic crystal structure. The photonic crystal may be a periodic structure in which two or more materials having different dielectric constants (or refractive indices) are arranged regularly. For example, the photonic crystal may be a periodic structure having a periodicity of a submicron or less (e.g., a wavelength of light or less). The photonic crystal may transmit, reflect, or absorb almost 100% of light of a certain wavelength band. In general, wavelength bands of light along certain directions that may not transmit through the photonic crystal are referred to as photonic bandgap. The photonic crystals having the photonic bandgap are applied in various fields. The first and second clad layers 12, 13 may have the same periodicity with that of the photonic crystal structure of the core layer 11. However, the core layer 11 may have the photonic crystal structure while the first and second clad layers 12, 13 do not have the photonic crystal structure.

Figure 2:
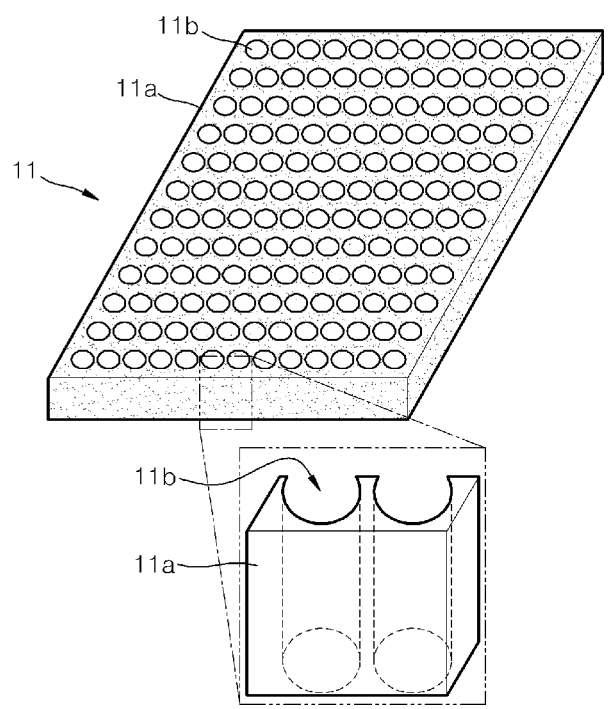
FIG. 2 is a schematic perspective view illustrating an example of a photonic crystal structure of a core layer in the acousto-optic device shown in FIG. 1.

FIG. 2 is a schematic perspective view illustrating an example of a photonic crystal structure of the core layer 11 in the acousto-optic device 10 shown in FIG. 1. Referring to FIG. 2, the core layer 11 includes a dielectric substrate 11a with dielectric particles 11b being vertically oriented therein. For example, when the core layer 11 is formed of the acousto-optic material, the dielectric substrate 11a may include the acousto-optic material.

In FIG. 2, the dielectric particles 11b of the dielectric substrate 11a are oriented perpendicularly to a surface of the dielectric substrate 11. The dielectric particles 11b of the dielectric substrate 11a, as illustrated in FIG. 2, extend completely through the dielectric substrate 11a. However, the dielectric particles 11b of the dielectric substrate 11a are not limited to or may stop short of extending completely through the dielectric substrate 11a. Further, the dielectric particles 11b may be formed of air or a dielectric material having a refractive index that differs from that of the dielectric substrate 11a. In addition, the dielectric particles 11b of the dielectric substrate 11a are arranged in a periodic structure in which square pattern unit cells are repeatedly arranged.

In another example embodiment, the dielectric substrate 11a may be formed of air. In this example, the dielectric particles 11b may be formed of a dielectric material that is not air (e.g., the acousto-optic material). That is, the core layer 11 may include dielectric poles or particles (e.g., the acousto-optic material) arranged between the first and second clad layers 12, 13 in the regular periodic structure, and air between the dielectric poles or particles.

In addition, in FIG. 2, the dielectric substrate 11a has dielectric particles 11b that are cylindrical. However, the dielectric particles 11b may have variable width that varies depending on a height. That is, a width of an intermediate portion of the dielectric particles 11b may be greater or less than widths at opposite end portions of the dielectric particles 11b. Further, the dielectric particles 11b may be conical. Moreover, the dielectric particles 11b may have polygonal cross-sections, such as triangular or square cross-sections, as well as the circular cross-section.

The photonic crystal structure of the core layer 11 shown in FIG. 2 is an example, and the photonic crystal periodic structure may have various designs. For example, FIG. 3 is a schematic plan view illustrating a 2D photonic crystal structure of the core layer 11 in the acousto-optic device 10 according to another example embodiment.

Figure 3:
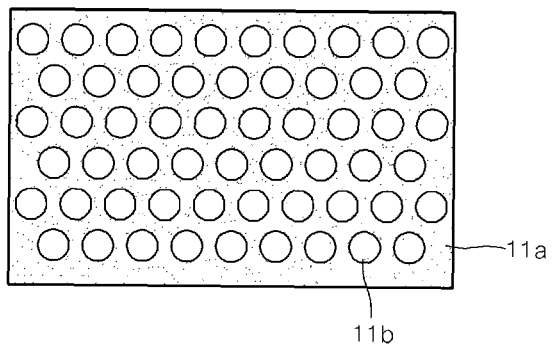
FIG. 3 is a schematic plan view illustrating a photonic crystal structure of a core layer in an acousto-optic device according to another example embodiment.

Referring to FIG. 3, the core layer 11 may have a periodic structure in which hexagonal pattern unit cells are repeatedly arranged. Beside the periodic structures shown in FIGS. 2 and 3, other various types of periodic structures may be used. For example, in replacement of the cylindrical dielectric particles 11b, dielectric materials having hexahedron or spherical shapes may be regularly arranged in the dielectric substrate 11a. In addition, FIGS. 2 and 3 only show a 2D photonic crystal periodic structure; however, the core layer 11 may be designed to have a 3D photonic crystal periodic structure (that is, a structure having periodicities in transverse, longitudinal, and height directions).

Figure 4:
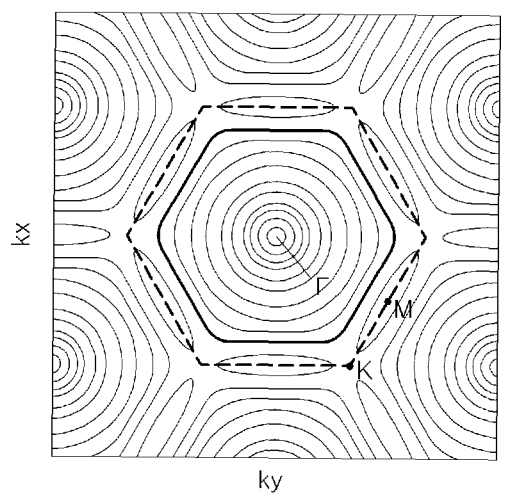
FIGS. 4 and 5 are diagrams illustrating examples of equifrequency contours of wavevectors in the wavevector space, which are related to refractive index distribution contours for propagating lights along a core layer having a periodic structure.

The core layer 11 having 2D or 3D photonic crystals may be designed so that a region may be generated around the photonic bandgap in which an angular distribution of the refractive index becomes flat. For example, FIG. 4 is a diagram illustrating an example of equifrequency contours of wavevectors ($k(\omega)$) of the lights flowing through the core layer 11 having the photonic crystal periodic structure shown in FIG. 3. When the contour distribution of the wavevector is divided by a wavenumber in the air (that is, $2\pi/\lambda$, where $\lambda$ denotes wavelength of light in air), the contour distribution of the wavevector may be converted into refractive index distribution contours (i.e., index surface). In FIG. 4, the hexagonal dashed line denotes one unit cell (i.e., the first Brillouin zone) in a wavevector space for the photonic crystal structure shown in FIG. 3. In FIG. 3, $\Gamma$, M, and K denote main points of the wavevectors that represent symmetry. Referring to FIG. 4, the angular distribution of the refractive index becomes circular around the center ($\Gamma$) of the unit cell in the wavevector space. This means that an isotropic refractive index characteristic is shown around the center ($\Gamma$) of the unit cell, that is, the refractive index is constant in any direction. On the other hand, the refractive index distribution is nearly hexagonal around a boundary of the unit cell (near the photonic bandgap), as denoted by a solid line. That is, six regions are generated around the boundary of the unit cell in which the angular distribution of the refractive index becomes flat. As a result, the refractive index of a wavevector at a vertex (K) of the unit cell and the refractive index of a wavevector at a center (M) in each side of the unit cell greatly differ from each other.

Figure 5:
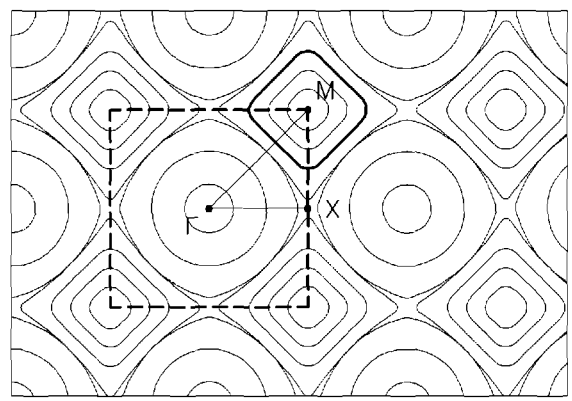

In addition, FIG. 5 is a diagram illustrating an example of contour distribution ($k(\omega)$) of wavevectors of the light flowing through the core layer 11 having the photonic crystal periodic structure shown in FIG. 2. As described above, the contour distribution of the wavevector may be converted into the refractive index distribution by the directions by being divided by the wavenumber in air. Referring to FIG. 5, in the photonic crystal periodic structure shown in FIG. 2, the isotropic refractive index characteristics, that is, the refractive index, is constant in any direction around the center ($\Gamma$) of the unit cell in the wavevector space is generated. The anisotropic refractive index distribution of square shape is generated around the boundary of the unit cell. In addition to the hexagonal and square anisotropic refractive index distributions shown in FIGS. 4 and 5, the core layer 11 may have various polygonal anisotropic distributions of the refractive index according to the design of the photonic crystal structure.

Figure 6:
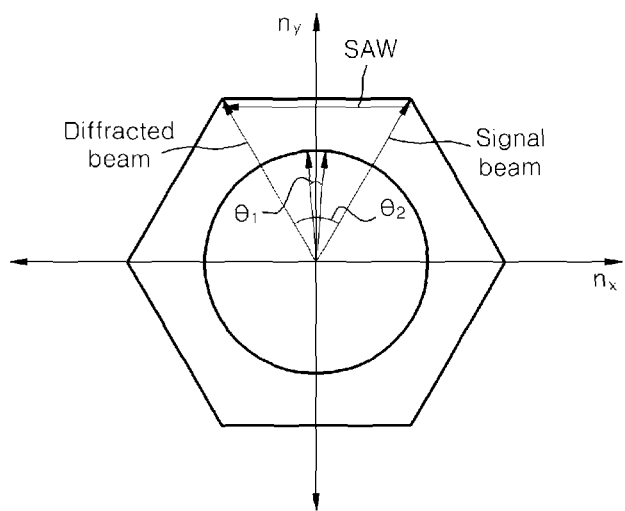
FIG. 6 is a diagram illustrating an example of a principle of using refractive index surfaces generated from the equifrequency contours illustrated in FIG. 4 to increase a diffraction angle range.

A range of diffraction angle of the light incident to the core layer 11 having the periodic photonic crystal structure may be greatly changed by using anisotropic refractive index distribution. FIG. 6 is a diagram illustrating an example of a principle of using the example refractive index distribution in FIG. 4 to increase a diffraction angle range. Referring to FIG. 6, in an isotropic structure in which the refractive index is constant in every direction, a maximum range of the diffraction angle of the light is $\theta 1$, even if the refractive index is regularly changed in the medium by changing the degrees of compression and rarefaction in the medium using ultrasonic waves. However, in the photonic crystal structure having a highly anisotropic refractive index distribution, when the incident light proceeds toward a vertex of the refractive index distribution, a SAW, such as an ultrasonic wave, is provided that proceeds along the flat region of the refractive index distribution. As a result, the light may be greatly diffracted. For example, the light may be diffracted within an angle range of $\theta 2$ along the photonic bandgap region toward another adjacent vertex.

Figure 7:
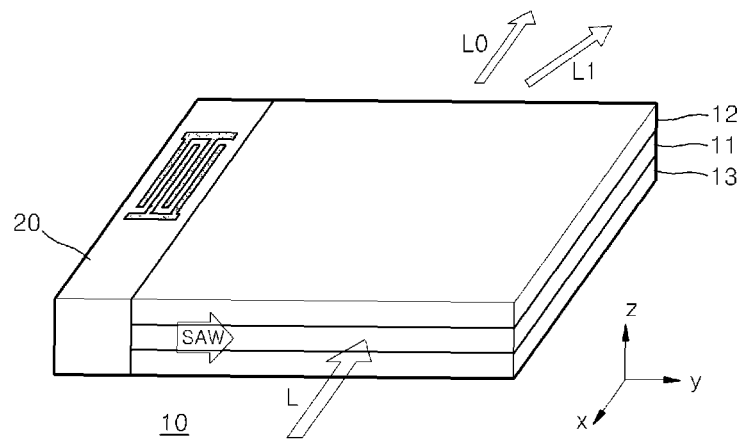
FIG. 7 is a schematic perspective view illustrating operations of an acousto-optic device according to an example embodiment.

FIG. 7 is a schematic perspective view illustrating an example of operations of the acousto-optic device 10. FIG. 7 shows one sound wave generator 20 that is disposed on a side surface of the acousto-optic device 10 for convenience of description. However, the sound wave generators 14, 15, and 16 illustrated in FIG. 1 may be used. Referring to FIG. 7, when light L is incident to the acousto-optic device 10 along an x direction, the sound wave generator 20 applies a SAW, such as an ultrasonic wave, to the acousto-optic device 10 in a direction that does not coincide with the preceding direction of the light L, for example, in a y direction. Here, a periodic structure of the photonic crystals in the core layer 11 may be oriented so that the incident light L may proceed toward a vertex region of the refractive index distribution in the core layer 11. In addition, the sound wave generator 20 may be disposed so that the SAW may proceed along the flat region of the refractive index distribution in the core layer 11.

Then, the incident light L is diffracted. As a result, 0th-order diffracted light beam L0 and 1st-order diffracted light beam L1 is output. According to the acousto-optic device 10 of the example embodiment, when the SAW is applied to the acousto-optic device 10, the light may be greatly diffracted while proceeding along the core layer 11 due to the highly anisotropic refractive index of the core layer 11, because a diffraction angle range that satisfies constructive interference is increased. Therefore, the acousto-optic device 10 may provide a wider diffraction angle range than that of the related acousto-optic device.

Here, the diffraction angle may be defined as a difference between angles of the 0th-order diffracted light (i.e., just transmitted) beam L0 and the 1st-order diffracted light beam L1 by the acousto-optic device 10. The diffraction angle of the light and the intensity of the diffracted light may be controlled by the frequency and intensity of the SAW. In addition, the frequency and the intensity of the SAW may be determined by a magnitude and a frequency of an electric signal applied to the sound wave generator 20. Therefore, the diffraction of the light in the acousto-optic device 10 may be controlled by controlling the electric signal applied to the sound wave generator 20.

The acousto-optic device 10 may be applied in various fields. For example, since the acousto-optic device 10 may adjust the intensity of the 0th-order diffracted light beam according to the diffraction degree of the light, the acousto-optic device 10 may perform as a light modulator of the 0th-order diffracted light. Since the incident light is not diffracted when the sound wave is not applied to the acousto-optic device 10, the incident light may transmit through the acousto-optic device 10 without a loss. However, when the incident light is diffracted by applying the sound wave to the acousto-optic device 10, 1st-order or other higher-order diffracted light beams are generated. As a result, the intensity of the 0th-order diffracted light beam transmitting through the acousto-optic device 10 is reduced. In addition, if more energy is allocated to the 1st-order or other higher-order diffracted lights according to the diffracted degree, the intensity of the 0th-order diffracted beam may be further reduced. Therefore, the acousto-optic device 10 may function as a light modulator that modulates the amplitude of the 0th-order diffracted light beam.

In addition, the acousto-optic device 10 may be applied as an optical scanner that deflects the incident light at a predetermined angle by changing the diffraction angle of the 1st-order diffracted light beam. For example, when the acousto-optic device 10 having the wide range of diffraction angle is used in the optical scanner, an operating range (i.e., scanning range) of the optical scanner may be increased. As a result, the configuration of the optical system used in the optical scanner may be simplified. For example, an additional optical system that is used to increase the diffraction angle range in related optical scanners might not be necessary.

Figure 8:
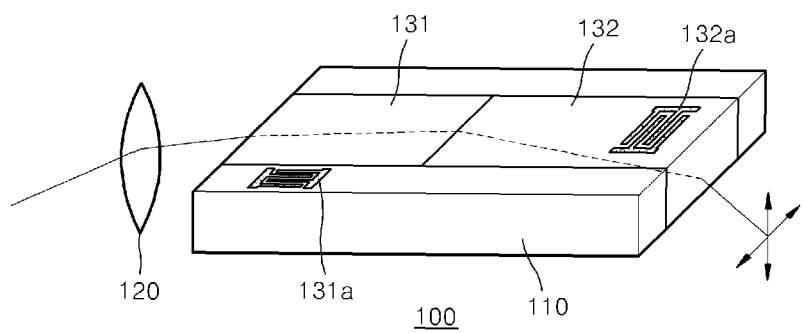
FIG. 8 is a schematic perspective view illustrating an example of an optical scanner including the acousto-optic devices of the example embodiments.

FIG. 8 is a schematic perspective view illustrating an example of an optical scanner 100 including the acousto-optic device 10 of the example embodiment. Referring to FIG. 8, the optical scanner 100 may include a substrate 110, a first acousto-optic device 131 disposed in the substrate 110, a second acousto-optic device 132 disposed in the substrate 110 to be adjacent to the first acousto-optic device 131, a light-coupling device 120 making the light incident to the first acousto-optic device 131, a first sound wave generator 131a providing the first acousto-optic device 131 with SAW, and a second sound wave generator 132a providing the second acousto-optic device 132 with SAW.

Although not shown in FIG. 8, similarly to the acousto-optic device 10 shown in FIG. 1, the first and second acousto-optic devices 131, 132 may respectively include a core layer having the photonic crystal structure, and clad layers on upper and lower portions of the core layer. In FIG. 8, the first sound wave generator 131a is disposed on the substrate 110 and the second sound wave generator 132a is disposed on the second acousto-optic device 132; however, the present embodiment is not limited thereto. Locations of the first and second sound wave generators 131a, 132a may be selected appropriately in consideration of the desired direction of the SAW. For example, the first sound wave generator 131a may be disposed on a side surface of the substrate 110 or an upper surface of the acousto-optic device 131. Likewise, the second sound wave generator 132a may be disposed on an upper surface or a side surface of the substrate 110.

In addition, a refraction lens is used as the light-coupling device 120 in FIG. 8; however, various optical devices may be used as the light-coupling device 120. For example, a prism, a diffraction grating layer, a Fresnel lens, or a micro-lens array may be used as the light-coupling device 120.

As an example, the first acousto-optic device 131 may be disposed so that the incident light may be deflected in a horizontal direction, and the second acousto-optic device 132 may be disposed so that the incident light may be deflected in a vertical direction. That is, as shown in FIG. 8, the light incident to the first acousto-optic device 131 through the light-coupling device 120 may be deflected in the horizontal direction. Then, the light deflected in the horizontal direction may be deflected in the vertical direction by the second acousto-optic device 132. Further, the light deflected in the vertical direction may then be output. Therefore, the optical scanner 100 may perform a scanning of the incident light in the horizontal direction, the vertical direction, or a combination thereof within a predetermined angle range by modulating the magnitude and frequency of alternating current (AC) voltage applied to the first and second sound wave generators 131a, 132a. In the example shown in FIG. 8, the optical scanner 100 includes two acousto-optic devices 131, 132; however, the optical scanner 100 may include one acousto-optic device that scans the light only in the horizontal or vertical direction, or a plurality of acousto-optic devices scanning the light in a direction. The optical scanner 100 may be applied in a laser image projection apparatus or a laser printer.

Figure 9:
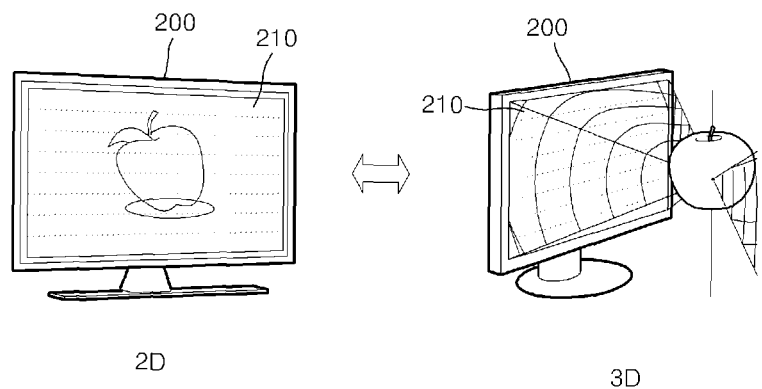
FIG. 9 is a schematic diagram illustrating an example of a two-dimensional (2D)/three-dimensional (3D) convertible image display apparatus including the acousto-optic devices of the example embodiments.

In addition, the acousto-optic device 10 described above may be applied to a 2D/3D switchable image display apparatus. For example, FIG. 9 is a schematic diagram illustrating an example of a two-dimensional (2D)/three-dimensional (3D) convertible image display apparatus including a plurality of the acousto-optic devices 10 of the example embodiments. Referring to FIG. 9, acousto-optic devices 210 having the same height as those of one or more pixel rows of a display panel 200 and extending in a transverse direction may be arranged on a surface of the display panel 200 to form an array along a longitudinal direction. Then, each of the acousto-optic devices 210 may deflect an image displayed by respectively corresponding pixel rows of the display panel 200 in a predetermined direction.

For example, if sound waves are not applied to the acousto-optic medium in the acousto-optic devices 210, the image displayed by each of the pixels of the display panel 200 is not deflected and transmitted through the array of the acousto-optic devices 210. In this case, as shown in a left side of FIG. 9, the 2D/3D switchable display apparatus may operate in a 2D display mode. On the other hand, in a multi-viewpoint display mode or a 3D display mode, each of the acousto-optic devices 210 may deflect the image displayed from each of the pixels to generate beams in a plurality of directions. For example, a portion of the acousto-optic devices 210 may deflect the image to a right eye of a viewer, and another portion of the acousto-optic devices 210 may deflect the image to a left eye of the viewer. As an another example, at a certain moment of a frame time, the acousto-optic devices 210 may deflect the image to a right eye of a viewer, and at another moment of a frame time, the acousto-optic devices 210 may deflect the image to a left eye of a viewer. Then, as shown in the right side of FIG. 9, the viewer may see 3D images.

Figure 10:
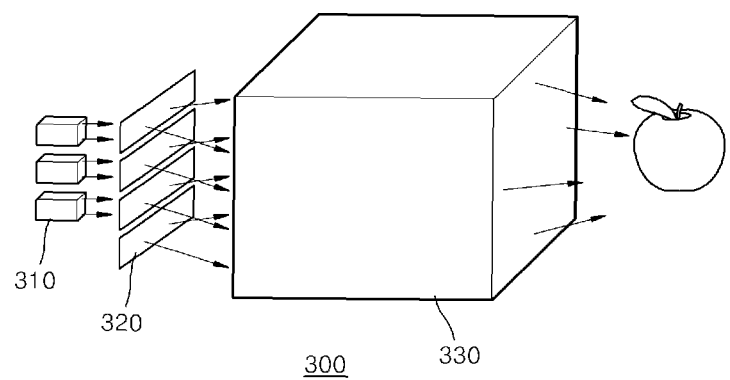
FIG. 10 is a schematic diagram illustrating an example of a holographic display apparatus including the acousto-optic devices of the example embodiments.

The acousto-optic device 10 may be applied to a holographic 3D display apparatus. FIG. 10 is a schematic diagram illustrating an example of a holographic 3D display apparatus 300 including the acousto-optic device 10 of the example embodiments. For example, as shown in FIG. 10, the holographic 3D display apparatus 300 includes a light source 310, an array of a plurality of acousto-optic devices 320, and a projection optical system 330. The light source 310 may be an array of a plurality of laser beams such as red, green and blue colors. In addition, the array of the plurality of acousto-optic devices 320 may be formed by manufacturing a plurality of acousto-optic devices extending in a transverse direction, and arranging the plurality of acousto-optic devices 320 to form an array along a longitudinal direction. Here, the acousto-optic devices 320 generate hologram rows in the horizontal direction. Each of the acousto-optic devices 320 may correspond to one or more hologram rows in a hologram image displayed by the holographic 3D display apparatus 300. The hologram rows diffracted by the plurality of acousto-optic devices 320 may be projected on a predetermined space by the projection optical system 330 to generate the 3D image.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An acousto-optic device, comprising: a core layer having a periodic photonic crystal structure in which unit cells of predetermined patterns are repeated to generate different refractive index distributions upon application of an acoustic wave; a first clad layer on a first surface of the core layer, the first clad layer having a refractive index that is different from a refractive index of the core layer; and a sound wave generator configured to apply surface acoustic waves (SAW) to at least one of the core layer and the first clad layer, wherein the core layer and the first clad layer to which the SAW are applied includes an acousto-optic material, wherein the core layer has an anisotropic refractive index distribution of a polygonal shape, in which refractive indices toward its vertexes are different from refractive indices toward an intermediate portion of sides of the refractive index distribution.

2. The acousto-optic device of claim 1, further comprising a second clad layer on a second surface of the core layer, the second surface being opposite the first surface, the second clad layer having a refractive index that is different from the refractive index of the core layer,
wherein a sound wave generator configured to apply surface acoustic waves (SAW) to at least one of the core layer, the first clad layer, and the second clad layer.

3. The acousto-optic device of claim 2, wherein the second clad layer includes an acousto-optic material.

4. The acousto-optic device of claim 3, wherein the acousto-optic material comprises ZnO, ZnS, AlN, $Al_2O_3$, $LiNbO_3$, $TiO_2$, Si, $SrTiO_3$, or any combination thereof.

5. The acousto-optic device of claim 2, wherein the first clad layer, the second clad layer, or a combination thereof is air.

6. The acousto-optic device of claim 1, wherein the periodic photonic crystal structure includes a periodic structure in which two or more materials having different dielectric constants are regularly arranged in a two-dimensional (2D) or a three-dimensional (3D) structure.

7. The acousto-optic device of claim 6, wherein the first clad layer has a periodic photonic crystal structure with equal periodicity to the photonic crystal structure of the core layer.

8. The acousto-optic device of claim 1, wherein the core layer comprises dielectric particles arranged in a regular period structure, and
wherein air is filled between the dielectric particles.

9. The acousto-optic device of claim 1, wherein the core layer comprises a dielectric substrate with dielectric particles arranged in the periodic photonic crystal structure.

10. The acousto-optic device of claim 9, wherein the dielectric particles are formed of air or a dielectric material, the dielectric material having a refractive index that is different from a refractive index of the dielectric substrate.

11. The acousto-optic device of claim 1, wherein a region of the core layer in which an angular distribution of the refractive index becomes flat is at certain frequencies and wave vectors of lights around a photonic bandgap,
wherein the core layer has an anisotropic refractive index distribution of a polygonal shape, in which refractive indices toward its vertexes are different from refractive indices toward an intermediate portion of sides of the refractive index distribution.

12. The acousto-optic device of claim 11, wherein incident light proceeds to a vertex of the refractive index distribution of the core layer, and
wherein the SAW proceeds along a region where the refractive index distribution of the core layer is flat.

13. An acousto-optic device, comprising: a core layer; a first clad layer on a first surface of the core layer, the first clad layer having a refractive index that is different from a refractive index of the core layer; and a sound wave generator configured to apply surface acoustic waves (SAW) to at least one of the core layer and the first clad layer, wherein the core layer and the first clad layer to which the SAW are applied includes an acousto-optic material, and wherein the first clad layer includes a periodic photonic crystal structure in which unit cells of predetermined patterns are repeated to generate different refractive index distributions upon application of an acoustic wave, wherein the core layer has an anisotropic refractive index distribution of a polygonal shape, in which refractive indices toward its vertexes are different from refractive indices toward an intermediate portion of sides of the refractive index distribution.

14. The acousto-optic device of claim 13, further comprising a second clad layer on a second surface of the core layer, the second surface being opposite the first surface, the second clad layer having a refractive index that is different from the refractive index of the core layer,
wherein a sound wave generator configured to apply surface acoustic waves (SAW) to at least one of the core layer, the first clad layer, and the second clad layer.

15. The acousto-optic device of claim 14, wherein the first clad layer, the second clad layer, or a combination thereof is air.

16. The acousto-optic device of claim 13, wherein the periodic photonic crystal structure includes a periodic structure in which two or more materials having different dielectric constants are regularly arranged in a two-dimensional (2D) or a three-dimensional (3D) structure.

17. The acousto-optic device of claim 16, wherein the core layer has a periodic photonic crystal structure with equal periodicity to the photonic crystal structure of the first clad layer.

18. The acousto-optic device of claim 13, wherein the first clad layer comprises dielectric particles arranged in a regular period structure, and wherein air is filled between the dielectric particles.

19. The acousto-optic device of claim 13, wherein the first clad layer comprises a dielectric substrate with dielectric particles arranged in the periodic photonic crystal structure.

20. The acousto-optic device of claim 19, wherein the dielectric particles are formed of air or a dielectric material, the dielectric material having a refractive index that is different from a refractive index of the dielectric substrate.

21. The acousto-optic device of claim 1, wherein the first clad layer, the core layer, or any combination thereof, are formed of a piezoelectric material.

\* \* \* \* \*